United States Patent [19]
Goe et al.

[11] Patent Number: 6,112,274
[45] Date of Patent: Aug. 29, 2000

[54] METHOD AND APPARATUS FOR PROCESSING MORE THAN ONE INTERRUPTS WITHOUT REINITIALIZING THE INTERRUPT HANDLER PROGRAM

[75] Inventors: Richard Goe, Redwood City; Vijay Goru, San Jose; George Thangadurai, Santa Clara, all of Calif.

[73] Assignee: Intel Corporation, Santa Clara, Calif.

[21] Appl. No.: 09/098,993

[22] Filed: Jun. 17, 1998

[51] Int. Cl.[7] .............................. G06F 13/24; G06F 13/26
[52] U.S. Cl. .................... 710/260; 710/263; 710/264; 710/266; 710/269
[58] Field of Search ...................................... 710/260, 263, 710/264, 269, 47, 48, 261, 265, 268, 266, 267

[56] References Cited

U.S. PATENT DOCUMENTS

| | | | |
|---|---|---|---|
| 5,261,107 | 11/1993 | Klim et al. ............................. | 710/266 |
| 5,446,910 | 8/1995 | Kennedy et al. ...................... | 353/20 |
| 5,511,200 | 4/1996 | Jayakumar ............................. | 710/266 |
| 5,675,807 | 10/1997 | Iswandhi et al. ..................... | 710/260 |
| 5,867,687 | 2/1999 | Simpson ................................ | 710/264 |
| 5,896,414 | 4/1999 | Meyer et al. ......................... | 375/222 |
| 5,944,840 | 8/1999 | Lever .................................... | 714/34 |

*Primary Examiner*—Ario Etienne
*Attorney, Agent, or Firm*—Blakely, Sokoloff, Taylor & Zafman LLP

[57] ABSTRACT

A system and method is provided for processing interrupt requests. The method is accomplished by detecting when an interrupt request is being stored in a storage location, examining the storage location storing the interrupt request, prioritizing the interrupt request when more than one interrupt request is stored in the storage location to determine an interrupt request processing order, clearing the interrupt request in the storage location that is to be processed, and processing the interrupt request. The system comprises a first storage location for storing an interrupt request, a second storage location for storing an interrupt handler program with encoded statements for examining the first storage location, prioritizing the interrupt request that is to be processed if more than one interrupt request is stored in said first storage location, clearing the interrupt request that is to be processed, and processing the interrupt request. The system further comprises a processor for executing the interrupt handler program.

19 Claims, 5 Drawing Sheets

METHOD AND APPARATUS FOR PROCESSING MORE THAN ONE INTERRUPTS WITHOUT REINITIALIZING THE INTERRUPT HANDLER PROGRAM

BACKGROUND OF THE INVENTION

1. Field of the Invention

This invention relates generally to the field of data processing systems, and more particularly, to interrupts in data processing systems. Specifically, the present invention relates to improving the processing of interrupts.

2. Description of the Related Art

The demand for quicker and more powerful personal computers has led to many technological advances in the computer industry, including the development of faster processors to run software programs. However, at times it is necessary to stop a processor from running a software program to take care of an exceptional condition presented to the processor in the form of an interrupt request. The condition may be from an external hardware device that requires the use of the processor. There may be several types of interrupts and, to handle an interrupt request, the processor invokes an appropriate program depending on the type of interrupt request received.

Interrupt requests are stored in a status register while the processor determines what types of interrupt requests are pending. The status register has generally been designed to either store a single coded interrupt request or to hold many bits each indicating a type of interrupt request. In either case, when multiple interrupt requests are pending hardware logic must be designed to institute a priority mechanism. To institute a more complicated priority mechanism based on all the types of interrupt requests pending and the type of program that was being run in the processor can lead to substantial hardware. This hardware will occupy more area on the integrated circuit chip or require additional space in an implementation with discrete hardware components.

While an interrupt request is processed, the status register is not modified by the hardware preventing any additional interrupt requests from being taken. This leads to interrupt requests being lost. To prevent interrupt requests from being lost, current designs utilize other secondary status registers to hold these interrupt requests. This solution again requires additional hardware. Furthermore, the procedure is time consuming because interrupt handler software has to read the interrupt requests from multiple hardware elements. Thus, this solution exacerbates the problems associated with a single status register implementation.

SUMMARY OF THE INVENTION

In one aspect of the present invention, a method is provided for handling interrupt requests. The method comprises the steps of detecting when an interrupt request is being stored in a storage location, examining the storage location holding the interrupt request, prioritizing a processing order for the interrupt requests when more than one interrupt request is stored in the storage location, clearing the interrupt request that is to be processed, and processing the interrupt request.

In another aspect of the present invention, a program storage device readable by a general purpose computer and tangibly embodying a program of instructions executable by the computer is provided. The program of instructions detects when an interrupt request is being stored in a storage location, examines the storage location storing an interrupt request, prioritizes the processing order of the interrupt requests when more than one interrupt request is stored in the storage location, clears the interrupt request in the storage location that is to be processed, and processes the interrupt request.

In yet another aspect of the present invention a system for handling interrupt requests is provided. The system for handling interrupt requests comprises a storage location capable of holding an interrupt request, a second storage location storing an interrupt handler program with instructions for examining a storage location holding an interrupt request, prioritizing the processing order of the interrupt requests, clearing the interrupt request in the storage location that is to be processed, and processing the interrupt request. The system further comprises a processor for executing the interrupt handler program.

Figure 1:
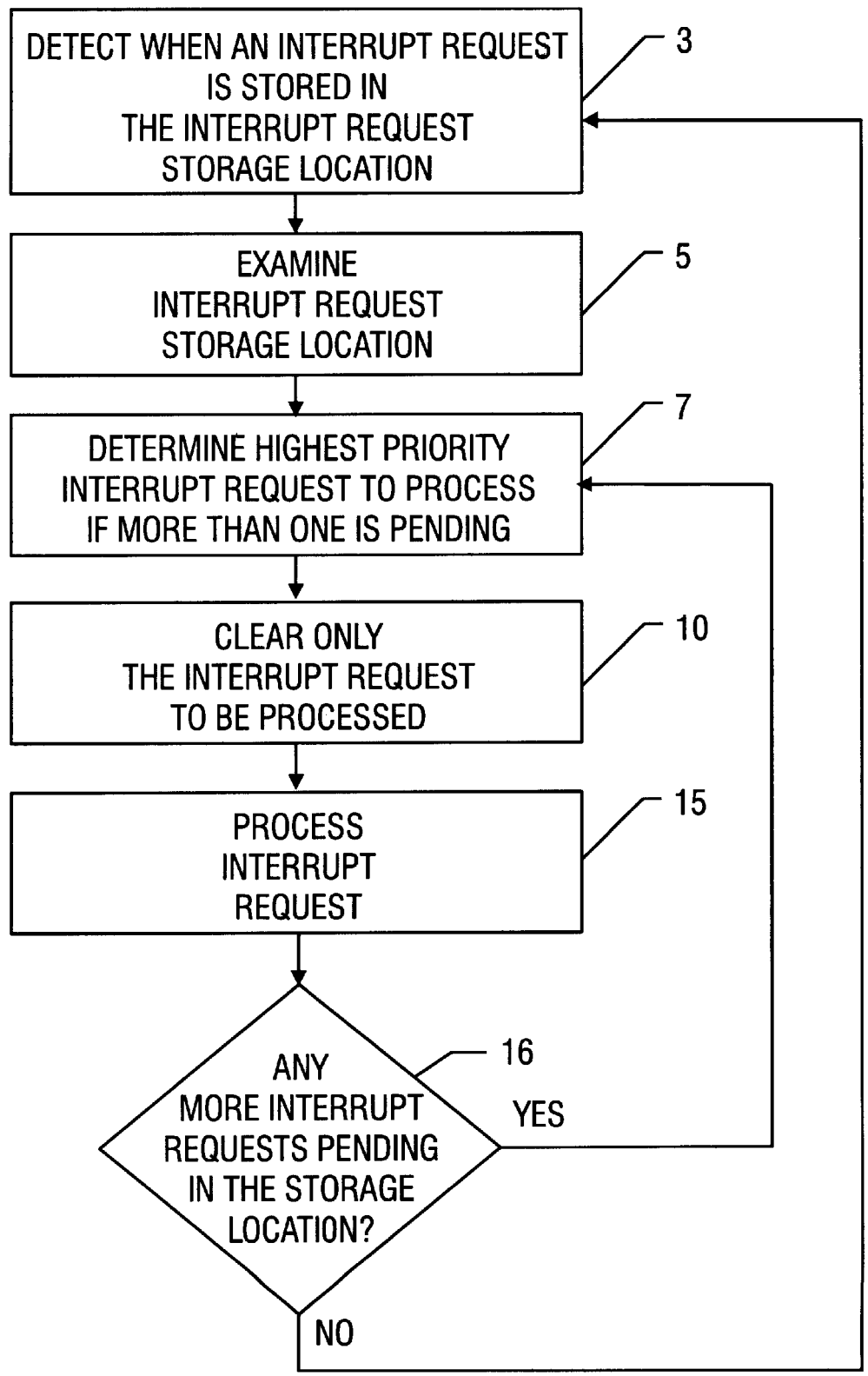
FIG. 1 is a flowchart illustrating a method for handling interrupt requests.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that even if such a development effort might be complex and time-consuming, it would nevertheless be a routine undertaking for those of ordinary skill in the art having the benefit of this disclosure.

Turning to the diagrams, FIG. 1 is a flowchart illustrating a method of handling one or more interrupt requests held in a storage location in a data processing system. As shown in block 3 of FIG. 1, the method first detects when an interrupt request is stored in an interrupt request storage location. Next, the storage location holding one or more interrupt requests is examined to determine what interrupt requests are pending, as represented in block 5. If more than one interrupt request is pending, the highest priority interrupt request to process is determined, as exemplified in block 7.

The prioritization scheme used in block 7 is implementation specific, for example based on the application running in the processor. The interrupt request that is to be processed is cleared from the storage location, as represented in block 10. Next, as illustrated by block 15, the interrupt request is processed. Finally, a decision block 16 is reached to determine if any more interrupt requests are pending. If no additional interrupt requests are pending, the method illustrated in FIG. 1, returns to block 3, and awaits further detection of interrupt requests. If one or more interrupt requests are still pending then the method returns to block 7, to determine the highest priority interrupt pending that will be processed and continues as previously described.

As will be appreciated by one of skill in the art having the benefit of this disclosure, decision block 16 permits the processing of recently stored interrupt requests while the method was handling another interrupt request in blocks, 7, 10 and 15. Furthermore, the embodiment described in FIG. 1 can be modified to prioritize and process more than a single interrupt request at a time. In this modified embodiment at block 7 multiple high priority interrupts can be selected for processing. At block 10, only the multiple interrupt requests to be processed are cleared, and at block 15 the multiple interrupt requests are processed.

Figure 2:
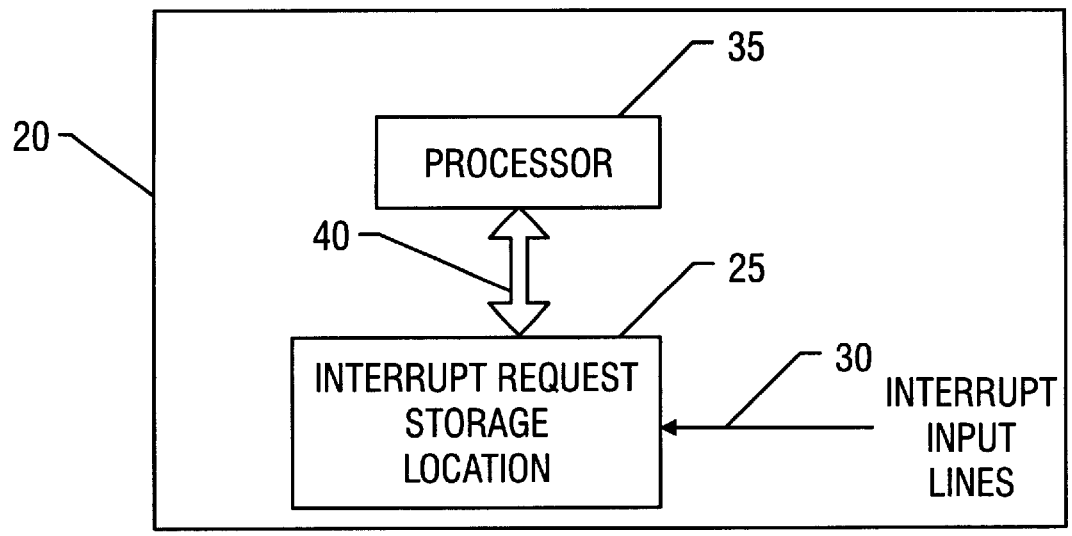
FIG. 2 is a high-level diagram illustrating a system for handling interrupt requests.

FIG. 2 is a high-level diagram illustrating an embodiment in accordance with the present invention. FIG. 2 shows a data processing system 20 that contains an interrupt request storage location 25 for holding one or more interrupt requests. The interrupt request storage location 25 holds the interrupt requests as set by external or internal interrupt input lines 30. The interrupt request storage location 25 can be any type of temporary read/write memory. An interrupt handler program running in the processor 35 examines the interrupt storage location 25, via a read/write bus 40, to determine the specific interrupt requests that are pending. The interrupt handler program is a coded embodiment of the interrupt request processing method of the present invention. The interrupt handler program running in the processor 35 prioritizes the order in which the interrupt requests will be processed if more than one interrupt request is pending. The interrupt handler program may also decide not process one or more interrupt requests. The reasons to not process an interrupt request are implementation specific, but can depend for example on the number and type of interrupt requests pending. After deciding what interrupt requests to process the interrupt handler program clears the pending interrupt request(s) in the interrupt request storage location 25 by writing to those locations via the read/write bus 40. Next, the processor 35 will process the interrupt requests.

Figure 3:
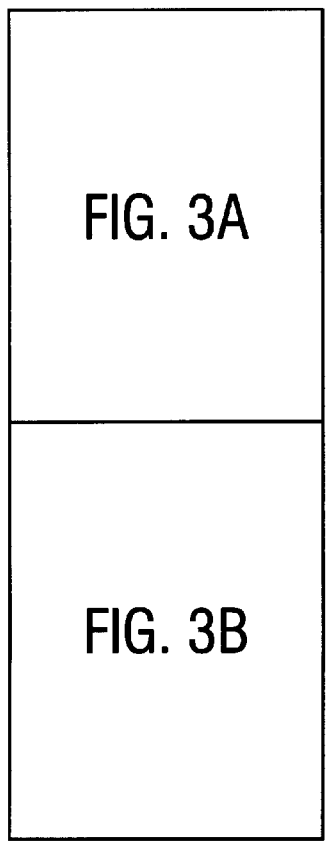
FIG. 3 interrelates FIG. 3A and FIG. 3B.
Figure 3A:
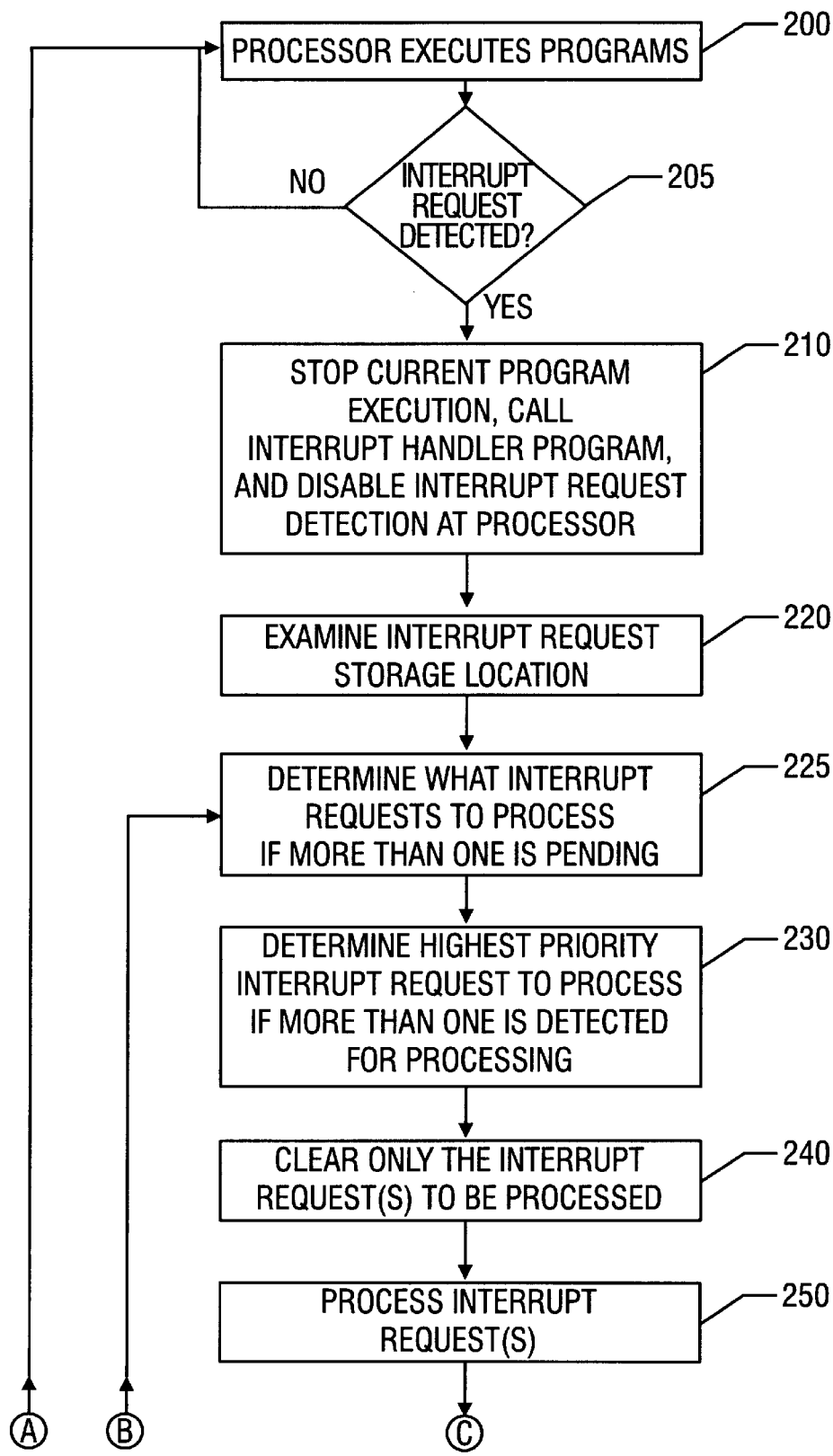
FIG. 3A is partial view of a flowchart illustrating a method for handling interrupt requests.
Figure 3B:
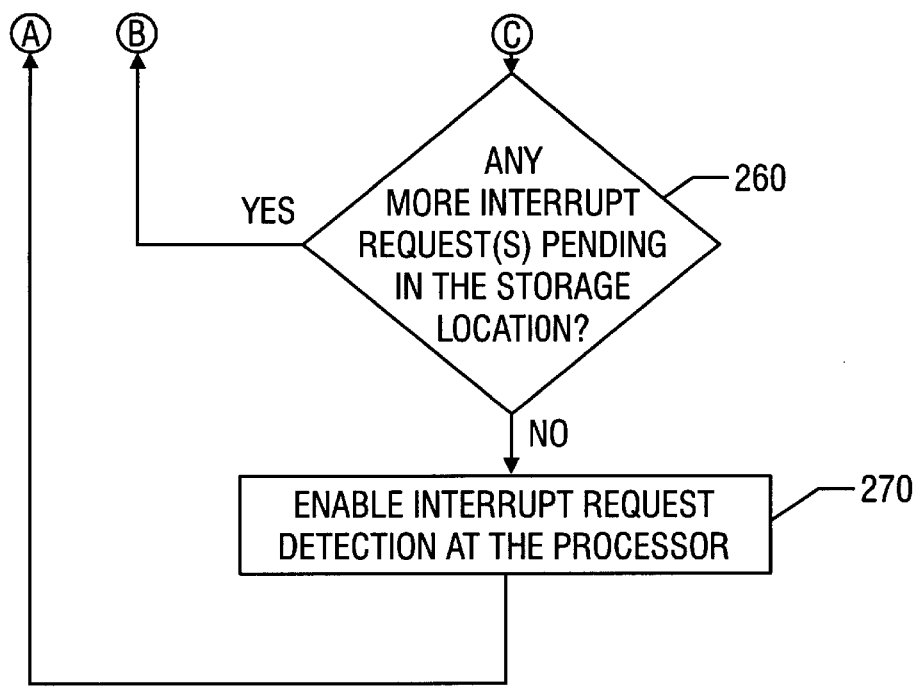
FIG. 3B is partial view of a flowchart illustrating a method for handling interrupt requests.

FIG. 3A and FIG. 3B together show a detailed flow chart of one embodiment of a method in accordance with the present invention. FIG. 3 shows how to interrelate FIG. 3A and FIG. 3B. Generally a processor is executing a program as represented in block 200. The processor will periodically monitor for an interrupt request as represented by decision block 205. After the processor detects the interrupt request, the processor stops execution of any running program and calls the interrupt handler program as represented in block 210. During this step the processor will also disable interrupt detection. Detecting interrupt requests and calling an interrupt handler program upon such detection are well known in the art. Calling the interrupt handler program may involve reading the program instructions from RAM or ROM (read only memory) memory. Any suitable technique known to the art may be employed and the technique employed by a particular embodiment will be implementation specific. Next, the interrupt handler program examines an interrupt request storage location as represented in block 220. In one particular embodiment, the interrupt request storage location is a storage unit, known as a register, having several bits indicating whether any interrupt requests are pending, and the types of interrupt requests that are pending. However, the invention is not so limited, as other types of storage mechanisms may be used. Other aspects, including the number and types of interrupt requests that can be held in the interrupt storage location are implementation dependent. According to the present invention, more than one interrupt request may be stored in the interrupt storage location.

Next, as illustrated in block 225, the interrupt handler program determines which of the pending interrupt requests it will handle if more than one interrupt request is stored in the interrupt storage location. However, the method of the present invention is flexible, and thus this step is optional based on the specific implementation.

Next, as represented in block 230, if the interrupt handler program determines to process more than a one interrupt request, the interrupt handler program prioritizes the processing order for the interrupt requests selected for processing in block 225. When the step represented by block 225 is not part of the embodiment, the interrupt handler program prioritizes and selects one interrupt request to process at block 230. The prioritization rules employed by a particular embodiment may be implementation specific. Typically, certain types of interrupt requests, such as those intended to initialize a processor, will be assigned higher priority than others and the interrupts are processed according to these assigned priorities.

The next step, as represented in block 240, is to clear within the storage location only the interrupt requests that the interrupt handler program will process. Other pending interrupt requests are not cleared. As represented in block 250, the interrupt handler program will next process the interrupt request(s) as determined in block 230. This embodiment allows for processing more than one interrupt request if the optional step in block 225 is supported.

Next, as represented by decision block 260, after processing the interrupt requests the interrupt handler program will re-examine the interrupt request storage location to determine if any more interrupt requests are pending. If one or more interrupt requests are still pending then the method loops back to block 225 to determine what interrupt requests to process if more than one interrupt request is pending. If the embodiment does not have the optional step represented by block 225, the method will loop back to block 230 to prioritize and determine what interrupt request to process if more than one interrupt request is pending. One skilled in the art with the benefit of this disclosure would appreciate that more interrupt requests can be stored in the interrupt storage location while the method of the present embodiment goes through blocks 225, 230, 240, and 250. In this case, these additional interrupt requests are detected at decision block 260. If no pending interrupt requests are found at decision block 260, then the interrupt request detection is enabled again, as represented by block 270.

Finally, the method returns to block 200 to resume execution of the program being processed prior to the initial interrupt request being detected. As will be appreciated by those skilled in the art having the benefit of this disclosure, once the processor resumes execution it is possible to again receive one or more interrupt requests.

Figure 4:
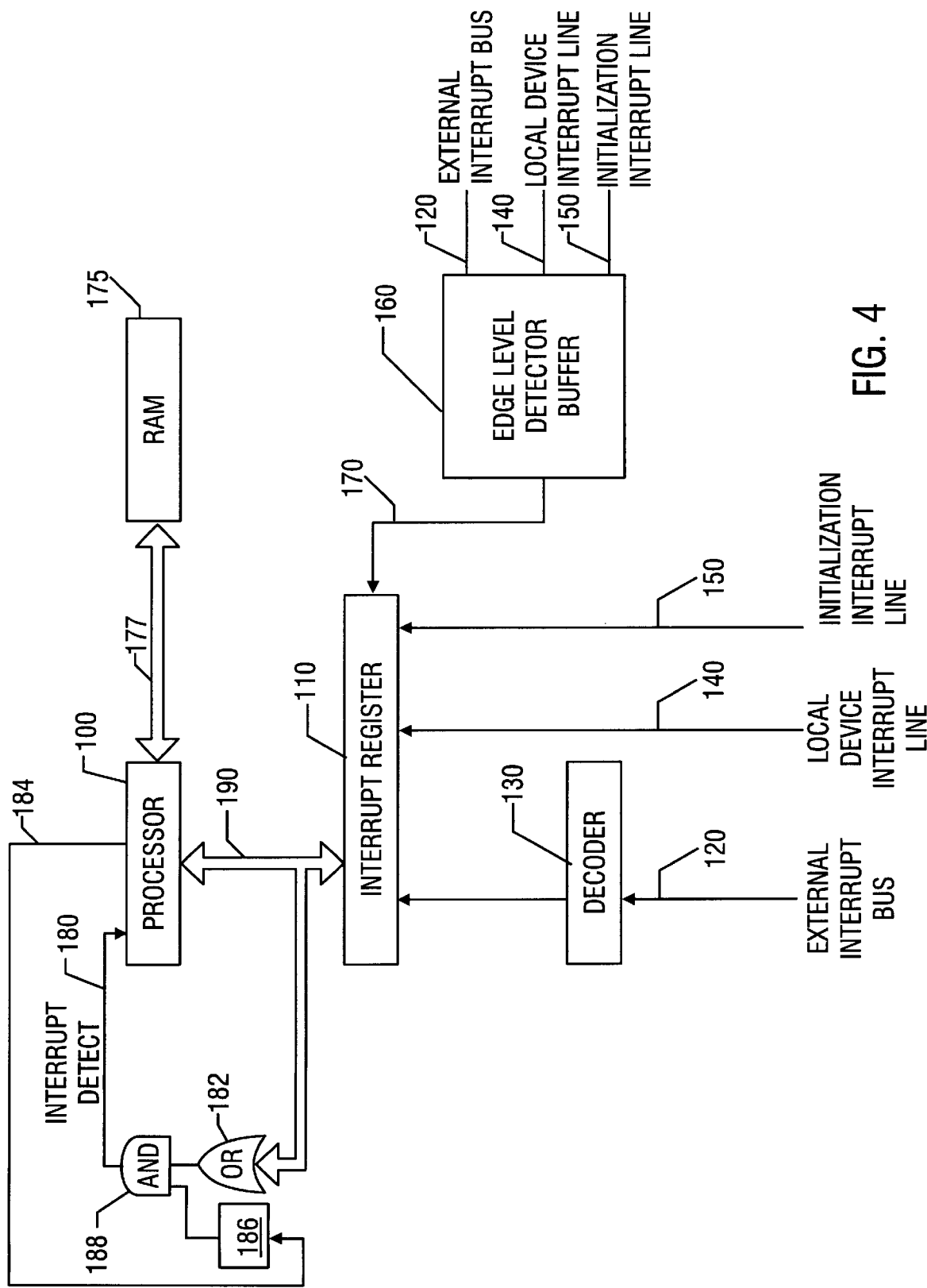
FIG. 4 is a block diagram of an embodiment of the system of the present invention.

FIG. 4 is a block diagram of one embodiment of an apparatus that can be used to implement the method of FIG. 3A and FIG. 3B. This particular embodiment comprises a processor 100 that may execute programs, including the interrupt handler program, and detect interrupt requests. The embodiment also comprises an interrupt storage location, that in this particular embodiment is an external register, the interrupt register 110. However, the interrupt storage location may be external RAM or internal memory in the processor 100 based on various alternative embodiments.

As will be appreciated by those skilled in the art, a processor can receive many types of interrupt requests. Some of those interrupt requests are those received from external hardware devices. A processor may also generally receive local device interrupts and an initialization interrupt. In the particular embodiment illustrated in FIG. 4, external interrupts are vectored and coded into 4 bits and must be decoded prior to storage in the interrupt register 110. The interrupt register 110 is a 64 bit register that may be set through individual pins and is read/write accessible through a control register access bus 190. The size of the interrupt register 110 may vary according to the data processing system that is implemented.

FIG. 4 shows the external interrupt bus 120 connected to a 4-to-16 bit decoder 130. The decoded vector of 16 bits is input to the interrupt register 110. A local device interrupt line 140 is directly connected to the interrupt register 110. An initialization interrupt line 150 is also directly connected to the interrupt register 110. As will be appreciated by those skilled in the art the number of external interrupts or local device interrupts may vary according to the application. Likewise, the external interrupts or local device interrupts may or may not be encoded in various alternative embodiments.

According to the present embodiment, the interrupt register 110 will store the output bits from the decoder 130, from the local device interrupt line 140, or from the initialization interrupt line 150, as determined by the output of an edge level detector buffer 160. The edge level detector buffer 160 detects whether an interrupt has been received by detecting either a rise or fall of an edge, or both the rise and fall of an edge depending on the settings of the edge level detector buffer 160. The edge level detector buffer will output a register control bit 170, used to register the bits of the interrupt inputs into the interrupt register 110.

The processor 100 reads and executes the interrupt handler program whenever the interrupt detect signal 180 is set. The interrupt detect signal 180 is partially controlled by the processor 100 with an interrupt enable signal 184. The interrupt enable signal 184 output by the processor 100 is stored in a single bit register 186. The interrupt detect signal 180 is determined by performing an "AND" function 188 of the interrupt enable signal 184 stored in the single bit register 186 with the output of the "OR" function 182 performed on the access bus bits 190. The access bus bits contain any set bits indicating that an interrupt request has been stored in the interrupt register 110. Therefore, if at least one interrupt request has been stored in the interrupt register 110 and the processor has enabled the interrupt enable signal 184, the interrupt detect signal 180 is set.

The interrupt handler program that follows the method described in FIG. 3A and FIG. 3B will be read from RAM memory 175 when the interrupt detect signal 180 is set and detected by processor 100. As will be appreciated by those skilled in the art the interrupt handler program may be encoded on different storage program medium types, such as ROM memory based on the specific embodiment. The processor 100 will read the interrupt handler program over RAM bus 177.

Once executing, the interrupt handler program uses the control register access bus 190 to read into the interrupt register 110 and determine what interrupt requests have been stored and are pending. The interrupt handler program according to the method shown in FIG. 3A and FIG. 3B, can determine what interrupt requests to process and prioritize the interrupt processing schedule. The interrupt handler program will also write to the interrupt register 110 over the control register access bus 190 to clear the bits of the interrupt requests that are to be processed. As one skilled in the art can appreciate, the interrupt handler program can be programmed to flexibly handle the interrupts based on the particular implementation.

Thus, the embodiments of the methods and systems described flexibly handle one or more interrupt requests according to the specific implementation, while increasing the speed for handling the interrupt requests and minimizing the need for additional hardware.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for handling interrupts comprising:

detecting when interrupts occur;

storing into a storage location a vector of bits wherein each bit is associated with an interrupt;

calling an interrupt handler program to process the interrupts;

examining the storage location to identify presence of interrupts which are to be processed by the interrupt handler program;

prioritizing those interrupts which are to be processed by the interrupt handler program;

clearing a bit in the storage location, associated with an interrupt request being processed;

processing the interrupt request; and processing subsequent interrupt requests which the interrupt handler program can process by clearing an appropriate bit in the storage location for that interrupt and processing a next prioritized interrupt request without reinitializing the interrupt handler program.

2. The method of claim 1, further comprising enabling an interrupt enable bit by a processor to initiate a reading of the storage location to identify if any interrupt is present.

3. The method of claim 1, further comprising updating said storage location with new interrupt requests to be processed by the interrupt handler program, while the interrupt handler program is processing a previous interrupt request, the interrupt handler program then processing the new interrupt without reinitializing the interrupt handler program.

4. A method for handling interrupts comprising:

detecting when interrupts occur;

storing into a storage location a vector of bits wherein each bit is associated with an interrupt:

generating an interrupt enable signal to indicate that interrupt processing is to be performed;

calling an interrupt handler program to process the interrupts;

examining the storage location to identify presence of interrupts which are to be processed by the interrupt handler program, if the interrupt enable signal is set to indicate that interrupt processing is to be performed;

prioritizing those interrupts which are to be processed by the interrupt handler program;

clearing a bit in the storage location, associated with an interrupt request being processed;

processing the interrupt request; and processing subsequent interrupt requests which the interrupt handler program can process by clearing an appropriate bit in the storage location for that interrupt and processing a next prioritized interrupt request without reinitializing the interrupt handler program, provided the interrupt enable signal is still set.

5. The method of claim 4, further comprising enabling an interrupt enable bit by a processor to generate the interrupt enable signal.

6. The method of claim 4, further comprising updating said storage location with new interrupt requests to be processed by the interrupt handler program, while the interrupt handler program is processing a previous interrupt request, the interrupt handler program then processing the new interrupt without reinitializing the interrupt handler program.

7. A program storage medium readable by a general purpose computer and tangibly embodying a program of instructions, which when executed by said computer, performs the following:

detecting when an interrupt occurs;

storing into a storage location a vector of bits wherein each bit is associated with an interrupt;

calling an interrupt handler program to process the interrupts;

reading the storage location to identify presence of interrupts which are to be processed by the interrupt handler program;

prioritizing those interrupts which are to be processed by an interrupt handler program;

clearing a bit in the storage location, associated with the interrupt request being processed;

processing the interrupt request; and processing subsequent interrupt requests which the interrupt handler program can process by clearing an appropriate bit in the storage location for that interrupt and processing a next prioritized interrupt request without reinitializing the interrupt handler program.

8. The program storage medium of claim 7, wherein the program of instructions further comprise enabling an interrupt enable bit by the computer to initiate a reading of the storage location to identify if any interrupt is present.

9. The program storage medium of claim 7, wherein the program of instructions further comprise updating the storage location with new interrupt requests to be processed by the interrupt handler program, while the interrupt handler program is processing a previous interrupt request, the interrupt handler program then processing the new interrupt without reinitializing the interrupt handler program.

10. A program storage medium readable by a general purpose computer and tangibly embodying a program of instructions, which when executed by said computer, performs the following:

detecting when interrupts occur;

storing into a storage location a vector of bits wherein each bit is associated with an interrupt;

generating an interrupt enable signal to indicate that interrupt processing is to be performed;

calling an interrupt handler program to process the interrupts;

examining the storage location to identify presence of interrupts which are to be processed by the interrupt handler program, if the interrupt enable signal is set to indicate that interrupt processing is to be performed;

prioritizing those interrupts which are to be processed by the interrupt handler program;

clearing a bit in the storage location, associated with an interrupt request being processed;

processing the interrupt request; and processing subsequent interrupt requests which the interrupt handler program can process by clearing an appropriate bit in the storage location for that interrupt and processing a next prioritized interrupt request without reinitializing the interrupt handler program, provided the interrupt enable signal is still set.

11. The program storage medium of claim 10, wherein the program of instructions further comprise enabling an interrupt enable bit by the computer to generate the interrupt enable signal.

12. The program storage medium of claim 10, wherein the program of instructions further comprise updating the storage location with new interrupt requests to be processed by the interrupt handler program, while the interrupt handler program is processing a previous interrupt request, the interrupt handler program then processing the new interrupt without reinitializing the interrupt handler program.

13. An apparatus for handling interrupt requests comprising, a first storage device for storing bits corresponding to interrupt requests;

a second storage device for storing an interrupt handler program; and a processor coupled to said second storage device for executing the interrupt handler program, said processor also coupled to said first storage device to read bits stored in said first storage device and prioritizing those interrupts that are to be processed by the interrupt handler program, said processor processing an interrupt after clearing its bit in the first storage device and processing subsequent interrupt requests which the interrupt handler program can process by clearing an appropriate bit in the first storage device for that interrupt to process a next prioritized interrupt request without reinitializing the interrupt handler program.

14. The apparatus of claim 13, further comprising a third storage location coupled to said processor for storing an interrupt enable bit, which is used by said processor to enable the interrupt handler program.

15. The apparatus of claim 13, wherein said first storage location is a register.

16. The apparatus of claim 13, wherein said first storage location is updated while said processor executes the interrupt handler program.

17. A computer system for handling interrupt requests comprising, first means for storing bits corresponding to interrupt requests;

second means for storing an interrupt handler program; and means for executing the interrupt handler program, wherein which the bits in the first means for storing are read to identify which interrupts are present and prioritized by the interrupt handler program for those interrupts that are to be processed by the interrupt handler program, said means for executing clearing a corresponding bit associated with an interrupt to be processed by the interrupt handler program processing the interrupt and further processing subsequent interrupts by clearing an appropriate bit as that interrupt is processed by the interrupt handler program, but without reinitializing the interrupt handler program for processing the subsequent interrupts, said means for executing coupled to said first and second means for storing.

18. The computer system of claim 17, further comprising a third means for storing coupled to said means for executing to store an interrupt enable bit which is used to enable the interrupt handler program.

19. The computer system of claim 17, wherein said first storing means is updated while the interrupt handler program is processing an interrupt.

* * * * *

UNITED STATES PATENT AND TRADEMARK OFFICE
CERTIFICATE OF CORRECTION

PATENT NO.    : 6,112,274
DATED         : August 29, 2000
INVENTOR(S)   : Goe et al.

It is certified that error appears in the above-identified patent and that said Letters Patent is hereby corrected as shown below:

Column 7,
Lines 44-45, delete "the interrupt" and insert -- an interrupt --.

Column 9,
Line 2, delete "which".

Signed and Sealed this

Third Day of September, 2002

*Attest:*

*Attesting Officer*

JAMES E. ROGAN
*Director of the United States Patent and Trademark Office*